Oct. 20, 1931.                J. BLIZARD                1,827,727
                             CONDUIT SYSTEM
                           Filed April 5, 1927
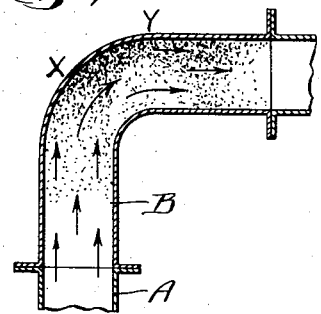
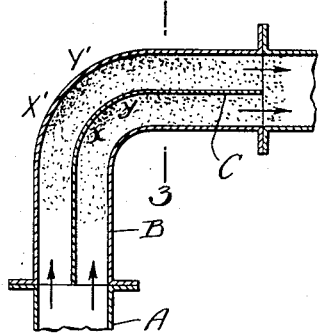
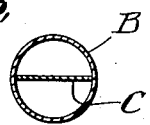
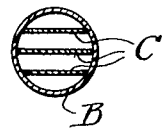
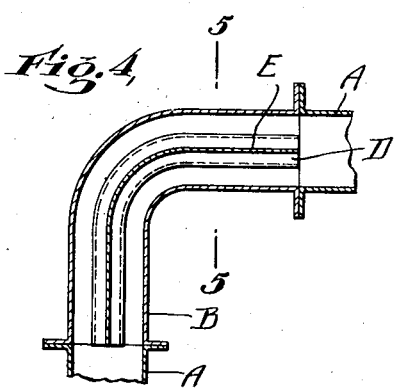
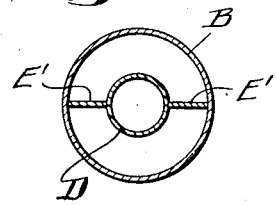
INVENTOR
JOHN BLIZARD
BY
John E. Hubbell
ATTORNEY Patented Oct. 20, 1931

1,827,727

UNITED STATES PATENT OFFICE

JOHN BLIZARD, OF GARDEN CITY, NEW YORK, ASSIGNOR TO FOSTER WHEELER CORPORATION, OF NEW YORK, N. Y., A CORPORATION OF NEW YORK

CONDUIT SYSTEM

Application filed April 5, 1927. Serial No. 181,075.

A general object of my present invention is to provide an improved construction of a hollow conduit in which flows a fluid carrying in suspension a quantity of finely divided solid matter for the purpose of preventing stratification of the solid matter. A more specific object of my invention is to provide a pipe with simple and effective means for preventing the tendency to the stratification of the solid material on a change in direction of the fluid flowing through the pipe. A further object of my invention is to reduce the tendency to the erosion of the internal wall of a pipe bend at the outer side of the bend as the result of concentration of solid material moved through the pipe by a carrying fluid stream. My invention is especially adapted for use in conduits and pipe bends through which move a stream of air carrying a quantity of pulverized coal or other finely divided material to prevent erosion of the conduit walls due to the abrasive action of the material.

The various features of novelty which characterize my invention are pointed out with particularity in the claims annexed to and forming part of the specification. For a better understanding of the invention, however, and the advantages possessed by it reference should be had to the accompanying drawing and descriptive matter in which I have illustrated and described preferred embodiments of the invention.

Of the drawing,

Fig. 1 is a view section of a conduit to which my invention is applicable,

Fig. 2 is a view showing the conduit of Fig. 1 provided with my invention,

Fig. 3 is a section on the line 3—3 of Fig. 2,

Fig. 4 is a view in section of a pipe bend provided with a modified form of my invention, Fig. 5 is a section on the line 5—5 of Fig. 4, and Fig. 6 is a view similar to Fig. 3 showing a modified form.

In the drawing is illustrated a conduit pipe A in which flows a fluid such as air under pressure carrying in suspension a large quantity of finely divided solid matter such as pulverized coal, an arrangement common in supplying fuel and air to a pulverized coal burner nozzle. The flow through the pipe consists of a homogeneous mixture of solid material and gas flowing in the direction of the arrows as shown in Fig. 1. The stream retains its uniform quality while the conduit is substantially straight. On a change of direction of the conduit such as occurs in a pipe bend as shown in the drawings, the direction of the fluid flow is necessarily changed. On a change of direction of the flow, the solid material tends to proceed with its original velocity in the same direction as before due to its momentum and does not change its direction until it is forced to do so by the walls of the conduit. For example, in the pipe bend shown, the greater portion of the material will contact with the outer wall of the conduit along the section XY, resulting in an accumulation of the finely divided solid matter on that side of the conduit. The number of particles of solid matter per unit volume of gas is therefore greater on the outer side than on the inner side of the stream. This results not only in the undesirable segregation of the solid material in one half of the conduit but also the continued contact of an abrasive material on one portion of the conduit will cause greater wear on that portion and necessarily require replacement of that portion in a comparatively short time.

My invention is primarily devised for the purpose of preventing such stratification of the solid material. In Figs. 2 and 3, I have illustrated one embodiment of my invention in which a short section of circular pipe B in the form of a pipe bend, secured at its flanged ends to flanges on adjacent sections of the conduit A, in which the direction of fluid flow is indicated by the arrows and which is provided with my improved means for preventing stratification of the solid material passing through the pipe bend. The pipe bend is provided with a thin metallic diaphragm C extending across one diameter of the pipe in a plane parallel to the direction of the flow and perpendicular to the radii of the arc of the pipe bend. The diaphragm C may be formed integral with or be secured to the inner walls of the conduit in any desirable manner and is arranged to extend substantially throughout the bent portion of the pipe bend. With this arrangement the solid particles on the right side of the stream contact with the diaphragm along the section $xy$, while the particles on the left side of the stream are deflected by the outer wall of the conduit along the section $X'Y'$ which, as can be seen, is considerably shorter than the section $XY$ in Fig. 1. In this arrangement the segregation is substantially reduced to about one-half of that of a conduit system in which no diaphragm is provided. My invention contemplates the use of one or more parallel diaphragms C in planes parallel to the direction of flow as shown in Fig. 6. The extent by which stratification of the solid material is reduced is increased by increasing the number of subdivisions made in the pipe section. The number of subdivisions is limited only by the practical objections to the decrease in the rate of flow caused by a large number of divisions.

In Figs. 4 and 5, of the drawings, I have illustrated a modified form of my invention in which the conduit is provided with a subdividing partition in the form of a hollow tubular member D concentric with the conduit and partitions E and E' extending from the outer side of the tube D to the adjacent inner walls of the conduit member. The diaphragm members E and E' are provided not only to support the tube D in position but also to serve as subdividing members in the conduit. In this arrangement the segregation and abrasive action of the solid particles is still further reduced due to the increased amount of surface on which the particles may contact. My invention is not dependent on any particular size or shape of conduit but is applicable to conduits of any practical size or cross section.

My invention is characterized by its simplicity and low cost of construction and effectiveness of operation. It is especially advantageous in those constructions wherein a solid material having abrasive properties is conveyed by a gas or a liquid from a main supply to a point or use.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a conduit arranged to convey a fluid under pressure carrying abrasive solid material in suspension and having a portion of said conduit bent and of constant cross section, the improvement which consists of means for preventing stratification of the solid material due to the change in direction of the flow in said bent portion and comprising a tubular member positioned parallel to the longitudinal axis and extending throughout the greater part of said portion and diaphragm members extending transversely of the plane of curvature of said bent conduit portion between said tubular member and the walls of said conduit.

2. A tubular conduit adapted for conveying under pressure a homogeneous mixture of a fluid and an abrasive solid material in suspension therein and comprising substantially straight conduit portions and an intervening curved portion bent about a predetermined center and uniting with said straight portions to provide a smooth and unbroken flow path for said mixture, all of said portions having substantially the same cross-sectional area and being arranged in the same plane, and means for maintaining the homogeneity of said mixture and preventing excessive wear on the outer wall of said curved portion comprising a diaphragm diametrically positioned in and extending throughout said curved portion and having a substantial portion of its surface perpendicular to the radii from said predetermined center, whereby the mixture flowing through said conduit is divided into parallel flowing portions in said curved portion.

Signed at New York city, in the county of New York and State of New York, this 2nd day of April, A. D. 1927.

JOHN BLIZARD.